(12) United States Patent
Ellul et al.

(10) Patent No.: US 8,039,526 B2
(45) Date of Patent: Oct. 18, 2011

(54) THERMOPLASTIC VULCANIZATES INCLUDING NANOCLAYS AND PROCESSES FOR MAKING THE SAME

(75) Inventors: Maria Dolores Ellul, Silver Lake Village, OH (US); Paul Edward McDaniel, Cuyahoga Falls, OH (US); Thomas Gregory Lengyel, Rittman, OH (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 680 days.

(21) Appl. No.: 11/398,266

(22) Filed: Apr. 5, 2006

(65) Prior Publication Data

US 2007/0238810 A1  Oct. 11, 2007

(51) Int. Cl.
*C08K 9/00* (2006.01)

(52) U.S. Cl. ........ 523/200; 524/445; 525/133; 501/145; 516/100

(58) Field of Classification Search ............ 523/200–217
See application file for complete search history.

(56) References Cited

U.S. PATENT DOCUMENTS

| | | | | |
|---|---|---|---|---|
| 4,311,628 A * | 1/1982 | Abdou-Sabet et al. | ........ | 524/447 |
| 5,100,947 A * | 3/1992 | Puydak et al. | ................ | 524/423 |
| 5,652,284 A | 7/1997 | Eidt, Jr. et al. | .................. | 524/64 |
| 5,807,629 A | 9/1998 | Elspass et al. | ................ | 428/323 |
| 5,843,577 A * | 12/1998 | Ouhadi et al. | ............. | 428/474.7 |
| 5,883,173 A | 3/1999 | Elspass et al. | ................ | 524/446 |
| 6,034,164 A | 3/2000 | Elspass et al. | ................ | 524/445 |
| 6,060,549 A * | 5/2000 | Li et al. | .......... | 524/445 |
| 6,207,752 B1 * | 3/2001 | Abraham et al. | ............... | 525/67 |
| 6,362,288 B1 * | 3/2002 | Brewer et al. | ................ | 525/431 |
| 6,407,174 B1 * | 6/2002 | Ouhadi | .................. | 525/192 |
| 6,437,030 B1 * | 8/2002 | Coran et al. | ................. | 524/101 |
| 6,598,645 B1 * | 7/2003 | Larson | .......... | 152/548 |
| 6,602,954 B1 * | 8/2003 | Lin | ................ | 525/70 |
| 6,630,538 B1 * | 10/2003 | Ellul et al. | ..................... | 525/194 |
| 6,632,868 B2 * | 10/2003 | Qian et al. | ..................... | 524/445 |
| 6,759,464 B2 | 7/2004 | Ajbani et al. | ................. | 524/445 |
| 6,825,277 B2 * | 11/2004 | van Issum et al. | ............ | 525/191 |
| 2001/0003768 A1 * | 6/2001 | Finerman et al. | ............. | 525/192 |
| 2004/0171758 A1 * | 9/2004 | Ellul et al. | ..................... | 525/192 |
| 2006/0276579 A1 * | 12/2006 | Jarus et al. | .................... | 524/445 |
| 2007/0066743 A1 * | 3/2007 | Rogunova et al. | ............ | 524/445 |

FOREIGN PATENT DOCUMENTS

| | | |
|---|---|---|
| WO | WO 92/11295 | 7/1992 |
| WO | WO 92/12214 | 7/1992 |
| WO | WO 01/48080 | 7/2001 |
| WO | WO 01/81718 | 11/2001 |
| WO | WO 02/48257 | 6/2002 |
| WO | WO 02/100936 | 12/2002 |
| WO | 03/022917 | 3/2003 |
| WO | WO 2004005387 | 1/2004 |
| WO | WO 2004005388 | 1/2004 |
| WO | WO 2005044557 | 5/2005 |

OTHER PUBLICATIONS

LANXESS: BUNA EP G 3569 LF Product Data Sheet. Obtained online on Sep. 16, 2008.*
Hawley's Condensed Chemical Dictionary, 12 edition, 1993, p. 733.*
"The Effects of Dynamic Vulcanization on the Morphology and Rheology of TPV's and Their Nanocomposites", Thakkar et al., Presented at a meeting of the Rubber Division, American Chemical Society San Francisco, CA, Apr. 28-30, 2003.
Galgali G et al: "ARheological Study on the Kinetics of Hybrid Formation in Polypropylene Manocomposites" Macromolecules, ACS, Washington, DC, US, vol. 34, No. 4, Jan. 18, 2000, pp. 852-858, XP002222268 ISSN: 0024-9297.

* cited by examiner

*Primary Examiner* — Vasu Jagannathan
*Assistant Examiner* — Doris Lee
(74) *Attorney, Agent, or Firm* — Kevin M. Faulkner

(57) ABSTRACT

A method for preparing a nanoclay-filled thermoplastic vulcanizate, the method comprising introducing an olefinic thermoplastic vulcanizate, a functionalized thermoplastic resin, and a surface-modified nanoclay, where the blending takes place at a temperature above the melt temperature of the thermoplastic vulcanizate but below the temperature at which the surface-modified nanoclay degrades.

27 Claims, No Drawings

THERMOPLASTIC VULCANIZATES INCLUDING NANOCLAYS AND PROCESSES FOR MAKING THE SAME

FIELD OF THE INVENTION

The present invention is generally directed toward thermoplastic vulcanizates and processes for making the same.

BACKGROUND OF THE INVENTION

Thermoplastic elastomers are known. They have many of the properties of thermoset elastomers, yet they are processable as thermoplastics. One type of thermoplastic elastomer is a thermoplastic vulcanizate, which may be characterized by finely-divided rubber particles dispersed within a plastic. These rubber particles are crosslinked to promote elasticity.

Layered mineral clays, such as smectite clays, have been integrated to form polymer-clay nanocomposites. These nanocomposites have included thermoplastic nanocomposites such as those prepared from nylon and montmorillonite clay. Thermoset nanocomposites have also been developed that include, for example, functionalized rubbers.

In an attempt to make useful thermoplastic vulcanizate nanocomposites, thermoplastic vulcanizates have been prepared as reported by Thakkar et al., Paper No. 25, Rubber Division, American Chemical Society, 2003. According to this teaching, rubber, extender oil, cure activator, and silicate nanoclay were compounded at low temperatures within a first mixing stage. Once compounded, dynamic vulcanization was effected in a second stage mix at elevated temperatures with polypropylene to form a thermoplastic vulcanizate. It was reported that the presence of the smectic clay diminishes the cure of the EPDM rubber, thereby requiring an increase in the cure system concentration to maintain crosslink density.

A desire therefore remains for a technologically useful thermoplastic vulcanizate including layered mineral clays and/or thermoplastic vulcanizate nanocomposites.

SUMMARY OF THE INVENTION

In one or more embodiments of the present invention provides a method for preparing a nanoclay-filled thermoplastic vulcanizate, the method comprising introducing a thermoplastic vulcanizate, a functionalized thermoplastic resin, and a surface-modified nanoclay, where the introducing takes place at a temperature above the melt temperature of the thermoplastic vulcanizate but below the temperature at which the surface-modified nanoclay degrades.

In one or more embodiments of the present invention also provides a method for preparing a nanoclay-filled thermoplastic vulcanizate, the method comprising preparing a thermoplastic vulcanizate by dynamically vulcanizing rubber within a mix with a thermoplastic resin, introducing to the thermoplastic vulcanizate, a surface-modified nanoclay and a functionalized thermoplastic resin, and mixing the thermoplastic vulcanizate, the nanoclay, and the thermoplastic resin at a temperature above the melt temperature of the thermoplastic resin.

DETAILED DESCRIPTION OF ILLUSTRATIVE EMBODIMENTS

The present invention provides one or more methods for making nanoclay-filled thermoplastic vulcanizates by introducing nanoclay and thermoplastic vulcanizate after dynamic vulcanization of the thermoplastic vulcanizate. The resulting thermoplastic vulcanizates also include a functionalized thermoplastic polymer, which can be added before or after dynamic vulcanization. As a result of this method, thermoplastic vulcanizates having advantageous properties can be achieved without deleteriously compromising other properties of the thermoplastic vulcanizate. In particular, to the extent that the nanoclay is added after dynamic vulcanization, the nanoclay does not impact the dynamic vulcanization process.

Thermoplastic vulcanizates include blends of cured or crosslinked rubber and a plastic. The plastic phase may be the continuous phase, which is believed to yield the thermoplastic properties of the blend. The rubber can be partially or fully cured by dynamic vulcanization. These blends may include other optional ingredients or constituents that are conventionally employed in the art.

Any rubber or mixture thereof that is capable of being dynamically cured may be used. Reference to a rubber may include mixtures of more than one rubber. Non-limiting examples of useful rubbers include olefinic elastomeric copolymers, butyl rubber, natural rubber, styrene-butadiene copolymer rubber, butadiene rubber, acrylonitrile rubber, butadiene-styrene-vinyl pyridine rubber, urethane rubber, polyisoprene rubber, epichlorohydrin terpolymer rubber, polychloroprene, and mixtures thereof.

The term olefinic elastomeric copolymer refers to rubbery copolymers polymerized from ethylene, at least one α-olefin monomer, and optionally at least one diene monomer. The α-olefins may include, but are not limited to, propylene, 1-butene, 1-hexene, 4-methyl-1 pentene, 1-octene, 1-decene, or combinations thereof. In one embodiment, the α-olefins include propylene, 1-hexene, 1-octene or combinations thereof. The diene monomers may include, but are not limited to, 5-ethylidene-2-norbornene; 5-vinyl-2-norbornene; divinyl benzene; 1,4-hexadiene; 5-methylene-2-norbornene; 1,6-octadiene; 5-methyl-1,4-hexadiene; 3,7-dimethyl-1,6-octadiene; 1,3-cyclopentadiene; 1,4-cyclohexadiene; dicyclopentadiene; or a combination thereof. In the event that the copolymer is prepared from ethylene, α-olefin, and diene monomers, the copolymer may be referred to as a terpolymer or even a tetrapolymer in the event that multiple α-olefins or dienes are used.

In one or more embodiments, the olefinic elastomeric copolymers include from about 12 to about 85% by weight, or from about 20 to about 80% by weight, or from about 40 to about 70% by weight, and or from about 60 to about 66% by weight ethylene units deriving from ethylene monomer, and from about 0.1 to about 15% by weight, or from about 0.5 to about 12% by weight, or from about 1 to about 10% by weight, or from about 2 to about 8% by weight diene units deriving from diene monomer, with the balance including α-olefin units (such as propylene) deriving from α-olefin monomer. Expressed in mole percent, the terpolymer of one embodiment includes from about 0.1 to about 5 mole percent, or from about 0.5 to about 4 mole percent, or from about 1 to about 2.5 mole percent diene units deriving from diene monomer. In one or more embodiments, where the diene includes 5-ethylidene-2-norbornene the olefinic elastomeric copolymer may include at least 6% by weight, in other embodiments at least 8% by weight, and in other embodiments at least 10% by weight units deriving from 5-ethylidene-2-norbornene.

In one or more embodiments, olefinic elastomeric copolymers have a weight average molecular weight ($M_w$) that is greater than 50,000, in other embodiments greater than 100,000, in other embodiments greater than 200,000, and in other embodiments greater than 300,000; and the weight average molecular weight of the preferred olefinic elastomeric copolymers of one embodiment is less than 1,200,000, in other embodiments less than 1,000,000, in other embodiments less than 900,000, and in other embodiments less than 800,000. In one or more embodiments, useful olefinic elastomeric copolymers have a number average molecular weight ($M_n$) that is greater than 20,000, in other embodiments greater than 60,000, in other embodiments greater than 100,000, and in other embodiments greater than 150,000; and the number average molecular weight of the olefinic elastomeric copolymers of one or more embodiments is less than 500,000, in other embodiments less than 400,000, in other embodiments less than 300,000, and in other embodiments less than 250,000.

In one or more embodiments, olefinic elastomeric copolymers may also be characterized by having a Mooney viscosity ($ML_{(1+4)}$ at 125° C.) per ASTM D 1646, of from about 25 to about 500 or from about 50 to about 450. Where higher molecular weight olefinic elastomeric copolymers are employed within the thermoplastic vulcanizates of this invention, these high molecular weight polymers may be obtained in an oil-extended form. These oil-extended copolymers typically include from about 15 to about 100 parts by weight, per 100 parts by weight rubber, of a paraffinic oil. The Mooney viscosity of these oil-extended copolymers may be from about 35 to about 80 or from about 45 to about 70.

In one or more embodiments, olefinic elastomeric copolymers may be characterized by having an intrinsic viscosity, as measured in Decalin at 135° C., up from about 2 to about 8 dl/g, or from about 3 to about 7 dl/g, or from about 4 to about 6.5 dl/g.

Olefinic elastomeric copolymers may be manufactured or synthesized by using a variety of techniques. For example, these copolymers can be synthesized by employing solution, slurry, or gas phase polymerization techniques that employ numerous catalyst systems including Ziegler-Natta systems, single-site catalysts including vanadium catalysts and Group IV-VI metallocenes, and Brookhart catalysts. Elastomeric copolymers are commercially available under the tradenames Vistalon™ (ExxonMobil Chemical Co.; Houston, Tex.), Keltan™ (DSM Copolymers), Nordel™ IP (Dow Chemical Company), NORDEL MG™ (Dow Chemical Company), Royalene™ (Chemtura) and Buna™ (Lanxess).

In one or more embodiments, the rubber can be highly cured. In one embodiment, the rubber is advantageously completely or fully cured. The degree of cure can be measured by determining the amount of rubber that is extractable from the thermoplastic vulcanizate by using cyclohexane or boiling xylene as an extractant. This method is disclosed in U.S. Pat. No. 4,311,628. In one embodiment, the rubber has a degree of cure where not more than 10 weight percent, in other embodiments not more than 6 weight percent, in other embodiments not more than 5 weight percent, and in other embodiments not more than 3 weight percent is extractable by cyclohexane at 23° C. as described in U.S. Pat. Nos. 5,100,947 and 5,157,081. Alternatively, in one or more embodiments, the rubber has a degree of cure such that the crosslink density is preferably at least $4\times10^{-5}$, in other embodiments at least $7\times10^{-5}$, and in other embodiments at least $10\times10^{-5}$ moles per milliliter of rubber. See also "Crosslink Densities and Phase Morphologies in Dynamically Vulcanized TPEs," by Ellul et al., RUBBER CHEMISTRY AND TECHNOLOGY, Vol. 68, pp. 573-584 (1995).

Any thermoplastic resin that can be employed in the manufacture of thermoplastic vulcanizates can be used to manufacture the thermoplastic vulcanizates employed in this invention. Useful thermoplastic resins may include solid, generally high molecular weight plastic resins. In one or more embodiments, these thermoplastic resins include un-functionalized resins. In other embodiments, the thermoplastic component of the thermoplastic vulcanizate may include a functionalized thermoplastic resin either alone or in combination with an unfunctionalized resin.

These resins may include crystalline and semi-crystalline polymers. In one or more embodiments, these resins may be characterized by a crystallinity of at least 25% by weight, in other embodiments at least 30% by weight, and in other embodiments at least 35% by weight. Crystallinity may be determined by dividing the heat of fusion of a sample by the heat of fusion of a 100% crystalline polymer, which is assumed to be 209 joules/gram for polypropylene or 350 joules/gram for polyethylene. Heat of fusion can be determined by differential scanning calorimetry. Where the thermoplastic resin of one or more embodiments is propylene-based, the resins may be characterized by a heat of fusion of at least 50 J/g, in other embodiments in excess of 75 J/g, and in other embodiments in excess of 100 J/g. Where the thermoplastic resins of one or more embodiments are polyethylene-based, they may be characterized by a heat of fusion of at least 85 J/g, in other embodiments at least 100 J/g, and in other embodiments at least 130 J/g.

The thermoplastic polymers may be characterized by a high-flexural modulus. Flexural modulus may be measured according to ASTM-D 790A at 23° C. In one or more embodiments, the non-functionalized thermoplastic polymers may have a flexural modulus that is greater than 200 MPa, in other embodiments greater than 500 MPa, and in other embodiments greater than 2,000 MPa.

In one or more embodiments, useful thermoplastic resins may be characterized by an $M_w$ of from about 50 to about 2,000 kg/mole, and in other embodiments from about 100 to about 600 kg/mole. They are also characterized by an $M_n$ of about 25 to about 1,000 kg/mole, and in other embodiments about 50 to about 300 kg/mole, as measured by GPC with polystyrene standards.

In one or more embodiments, these thermoplastic resins can have a melt flow rate of about 0.5 to 1,000 dg/min, in other embodiments from about 5 to about 500 dg/min, and in other embodiments from about 10 to about 100 dg/min, per ASTM D-1238 at 230° C. and 2.16 kg load.

In one or more embodiments, these thermoplastic resins can have a melt temperature ($T_m$) that is from about 110° C. to about 250° C., in other embodiments from about 155 to about 170° C., and in other embodiments from about 160° C. to about 165° C. They may have a glass transition temperature ($T_g$) of from about −10 to about 10° C., in other embodiments from about −3 to about 5° C., and in other embodiments from about 0 to about 2° C. In one or more embodiments, they may have a crystallization temperature ($T_c$) of these optionally at least about 75° C., in other embodiments at least about 95° C., in other embodiments at least about 100° C., and in other embodiments at least 105° C., with one embodiment ranging from 105° to 115° C.

Exemplary thermoplastic polymers include crystalline, semi-crystalline, and crystallizable polyolefins, olefin copolymers, and non-olefin resins. The thermoplastic resins may be formed by polymerizing ethylene or α-olefins such as propylene, 1-butene, 1-hexene, 1-octene, 2-methyl-1-propene, 3-methyl-1-pentene, 4-methyl-1-pentene, 5-methyl-1-hexene, and mixtures thereof. Copolymers of ethylene and propylene and ethylene and/or propylene with another α-olefin such as 1-butene, 1-hexene, 1-octene, 2-methyl-1-propene, 3-methyl-1-pentene, 4-methyl-1-pentene, 5-methyl-1-hexene or mixtures thereof is also contemplated. Specifically included are the reactor, impact, and random copolymers of propylene with ethylene or the higher α-olefins, described above, or with $C_{10}$-$C_{20}$ diolefins. Comonomer contents for these propylene copolymers will typically be from 1 to about 30% by weight of the polymer, for example, See U.S. Pat. Nos. 6,268,438, 6,288,171, 6,867,260 B2, 6,245,856, and U.S. Publication No. 2005/010753. Copolymers available under the tradename VISTAMAXX™ (ExxonMobil) are specifically included. Other polyolefin copolymers may include copolymers of olefins with styrene such as styrene-ethylene copolymer or polymers of olefins with α,β-unsaturated acids, α,β-unsaturated esters such as polyethylene-acrylate copolymers. Non-olefin thermoplastic polymers may include polymers and copolymers of styrene, α,β-unsaturated acids, α,β-unsaturated esters, and mixtures thereof. For example, polystyrene, polyacrylate, and polymethacrylate may be used. Blends or mixtures of two or more polyolefin thermoplastics such as described herein, or with other polymeric modifiers, are also suitable in accordance with this invention. Useful thermoplastic polymers may also include impact and reactor copolymers.

The thermoplastic polymers may be synthesized by using an appropriate polymerization technique known in the art such as, but not limited to, the conventional Ziegler-Natta type polymerizations, and catalysis employing single-site organometallic catalysts including, but not limited to, metallocene catalysts.

In one embodiment, the thermoplastic resin includes a high-crystallinity isotactic or syndiotactic polypropylene. This polypropylene can have a density of from about 0.85 to about 0.91 g/cc, with the largely isotactic polypropylene having a density of from about 0.90 to about 0.91 g/cc. Also, high and ultra-high molecular weight polypropylene that has a fractional melt flow rate can be employed. These polypropylene resins are characterized by a melt flow rate that is less than or equal to 10 dg/min, optionally less than or equal to 1.0 dg/min, and optionally less than or equal to 0.5 dg/min per ASTM D-1238 at 2.16 kg load.

In certain embodiments, the thermoplastic vulcanizate may include a polymeric processing additive. The processing additive may be a polymeric resin that has a very high melt flow index. These polymeric resins include both linear and branched polymers that have a melt flow rate that is greater than about 500 dg/min, more preferably greater than about 750 dg/min, even more preferably greater than about 1000 dg/min, still more preferably greater than about 1200 dg/min, and still more preferably greater than about 1500 dg/min. Mixtures of various branched or various linear polymeric processing additives, as well as mixtures of both linear and branched polymeric processing additives, can be employed. Reference to polymeric processing additives can include both linear and branched additives unless otherwise specified. Linear polymeric processing additives include polypropylene homopolymers, and branched polymeric processing additives include diene-modified polypropylene polymers. Thermoplastic vulcanizates that include similar processing additives are disclosed in U.S. Pat. No. 6,451,915.

In one or more embodiments, the thermoplastic vulcanizates may include a mineral oil, a synthetic oil, or a combination thereof. These oils may also be referred to as plasticizers or extenders. Mineral oils may include aromatic, naphthenic, paraffinic, and isoparaffinic oils. In one or more embodiments, the mineral oils may be treated or untreated. Useful mineral oils can be obtained under the tradename SUNPAR™ (Sun Chemicals). Others are available under the name PARALUX™ (Chevron).

In one or more embodiments, synthetic oils include polymers and oligomers of butenes including isobutene, 1-butene, 2-butene, butadiene, and mixtures thereof. In one or more embodiments, these oligomers can be characterized by a number average molecular weight ($M_n$) of from about 300 to about 9,000 g/mole, and in other embodiments from about 700 to about 1,300 g/mole. In one or more embodiments, these oligomers include isobutenyl mer units. Exemplary synthetic oils include polyisobutylene, poly(isobutylene-co-butene), polybutadiene, poly(butadiene-co-butene), and mixtures thereof. In one or more embodiments, synthetic oils may include polylinear α-olefins, poly-branched α-olefins, hydrogenated polyalphaolefins, and mixtures thereof.

In one or more embodiments, the synthetic oils include synthetic polymers or copolymers having a viscosity in excess of about 20 cp, in other embodiments in excess of about 100 cp, and in other embodiments in excess of about 190 cp, where the viscosity is measured by a Brookfield viscometer according to ASTM D-4402 at 38° C. In these or other embodiments, the viscosity of these oils can be less than 4,000 cp and in other embodiments less than 1,000 cp.

Useful synthetic oils can be commercially obtained under the tradenames Polybutene™ (Soltex; Houston, Tex.), Indopol™ (BP; Great Britain), and Parapol™ (ExxonMobil). Oligomeric copolymers deriving from butadiene and its comonomers are commercially available under the tradename Ricon Resin™ (Sartomer). White synthetic oil is available under the tradename SPECTRASYN™ (ExxonMobil), formerly SHF Fluids (Mobil).

In one or more embodiments, the extender oils may include organic esters, alkyl ethers, or combinations thereof including those disclosed in U.S. Pat. Nos. 5,290,866 and 5,397,832. In one or more embodiments, the organic esters and alkyl ether esters may have a molecular weight that is generally less than about 10,000. In, one or more embodiments, suitable esters include monomeric and oligomeric materials having an average molecular weight of below about 2,000 and in other embodiments below about 600. In one or more embodiments, the esters may be compatible or miscible with both the polyalphaolefin and rubber components of the composition; i.e., they may mix with other components to form a single phase. In one or more embodiments, the esters include aliphatic mono- or diesters, or alternatively oligomeric aliphatic esters or alkyl ether esters. In one or more embodiments, the thermoplastic vulcanizates are devoid of polymeric aliphatic esters and aromatic esters, as well as phosphate esters.

In addition to the rubber, thermoplastic resins, and optional processing additives, the thermoplastic vulcanizates of the invention may optionally include reinforcing and non-reinforcing fillers, antioxidants, stabilizers, rubber processing oil, lubricants, anti-blocking agents, anti-static agents, waxes, foaming agents, pigments, flame retardants and other processing aids known in the rubber compounding art. These additives can comprise up to about 50 weight percent of the total composition. Fillers and extenders that can be utilized include conventional inorganics such as calcium carbonate, clays, silica, talc, titanium dioxide, carbon black and the like.

In one or more embodiments, the thermoplastic vulcanizates of this invention contain a sufficient amount of the rubber to form rubbery compositions of matter. The skilled artisan will understand that rubbery compositions of matter include those that have ultimate elongations greater than 100 percent, and that quickly retract to 150 percent or less of their original length within about 10 minutes after being stretched to 200 percent of their original length and held at 200 percent of their original length for about 10 minutes.

Thus, in one or more embodiments, the thermoplastic vulcanizates can include at least about 25 percent by weight, in other embodiments at least about 45 percent by weight, in other embodiments at least about 65 percent by weight, and in other embodiments at least about 75 percent by weight rubber. In these or other embodiments, the amount of rubber within the thermoplastic vulcanizates can be from about 15 to about 90 percent by weight, in other embodiments from about 45 to about 85 percent by weight, and in other embodiments from about 60 to about 80 percent by weight, based on the entire weight of the rubber and thermoplastic combined.

In one or more embodiments, the amount of thermoplastic polymer within the thermoplastic vulcanizates can be from about 5 to about 60% by weight, in other embodiments from about 10 to about 40% by weight and in other embodiments from about 12 to about 30%, based on the entire weight of the rubber and thermoplastic combined.

In one or more embodiments, where a blend of high-MFR and low-MFR resins are employed, the thermoplastic component may include from about 98 to about 95, in other embodiments from about 90 to about 80, and in other embodiments from about 70 to about 40 percent by weight low-MFR resin, based on the entire weight of the thermoplastic component with the balance including the high-MFR resin.

When employed, the thermoplastic vulcanizates may include from about 0 to about 5 parts by weight, or from about 0.1 to about 3 parts by weight, or from about 0.2 to about 2 parts by weight of a polymeric processing additive per 100 parts by weight rubber.

With respect to the oil, the thermoplastic vulcanizate may include from about 0 to about 250 parts by weight, or from about 50 to about 150 parts by weight, or from about 75 to about 130 parts by weight, of extender oil per 100 parts rubber. The quantity of extender oil added depends upon the properties desired, with the upper limit depending upon the compatibility of the particular oil and blend ingredients; this limit is exceeded when excessive exuding of extender oil occurs. The amount of extender oil depends, at least in part, upon the type of rubber. High viscosity rubbers are more highly oil extendable.

Fillers, such as carbon black, clay, talc, or calcium carbonate may be added in amount from about 1 to about 50, per 100 parts by weight of rubber. The amount of carbon black that can be used may depend, at least in part, upon the type of carbon black and the amount of extender oil that is used. In one or more embodiments, the thermoplastic vulcanizate, prior to the addition of the nanoclay, includes less than 40 parts by weight, in other embodiments less than 30 parts by weight, in other embodiments less than 20 parts by weight, and in other embodiments less than 10 parts by weight of a filler per 100 parts by weight of the rubber.

In one or more embodiments, it may be advantageous to employ a thermoplastic vulcanizate that includes a relatively low amount of thermoplastic resin, especially high molecular weight thermoplastic resin, so that additional thermoplastic resin can be added to the thermoplastic vulcanizate after dynamic vulcanization (e.g., together with the nanoclay). Nonetheless, while the volume fraction of the rubber may be greater than the thermoplastic resin (although not required), those skilled in the art appreciate that there is a minimum amount of thermoplastic resin required to achieve and maintain phase inversion in dynamic vulcanization, although this amount may vary based upon mixing intensity, the elasticity ratio, the viscosity ratio, interfacial tension, and the cure state. In one or more embodiments, the amount of thermoplastic resin included within the thermoplastic resin to which the nanoclay is introduced may include a thermoplastic resin to rubber weight ratio of at least 0.1:1, more preferably at least 0.2:1, even more preferably at least 0.25:1, still more preferably at least 0.3:1, and even more preferably 0.35:1.

While there is no upper limit on the amount of thermoplastic resin that may be present in the thermoplastic vulcanizate prior to dynamic vulcanization, the amount may be limited in one or more embodiments. For example, the maximum weight ratio of thermoplastic resin to rubber may be less than 2:1, in other embodiments less than 0.8:1, in other embodiments less than 0.6:1, in other embodiments less than 0.5:1, in other embodiments less than 0.45:1, and in other embodiments less than 0.4:1.

In one or more embodiments, the rubber is cured or crosslinked by dynamic vulcanization. The term dynamic vulcanization refers to a vulcanization or curing process for a rubber contained in a blend with a thermoplastic resin, wherein the rubber is crosslinked or vulcanized under conditions of high shear at a temperature above the melting point of the thermoplastic.

In one embodiment, the rubber can be simultaneously crosslinked and dispersed as fine particles within the thermoplastic matrix, although other morphologies may also exist. Dynamic vulcanization can be effected by mixing the thermoplastic elastomer components (optionally including the functionalized components and optionally stabilizers) at elevated temperature in conventional mixing equipment such as roll mills, Banbury mixers, Brabender mixers, continuous mixers, mixing extruders and the like. Methods for preparing thermoplastic vulcanizates is described in U.S. Pat. Nos. 4,311,628, 4,594,390, 6,503,984, and 6,656,693, although methods employing low shear rates can also be used.

The skilled artisan will be able to readily determine a sufficient or effective amount of vulcanizing agent to be employed without undue calculation or experimentation.

Any cure system that is capable of curing or crosslinking the rubber employed in preparing the thermoplastic vulcanizate may be used. For example, where the rubber includes an olefinic elastomeric copolymer, the cure system may include phenolic resins, free radical curatives, silicon-containing curatives, or other curatives conventionally employed in preparing thermosets.

Useful phenolic cure systems are disclosed in U.S. Pat. Nos. 2,972,600, 3,287,440, 5,952,425 and 6,437,030.

In one or more embodiments, phenolic resin curatives include resole resins, which can be made by the condensation of alkyl substituted phenols or unsubstituted phenols with aldehydes, preferably formaldehydes, in an alkaline medium or by condensation of bi-functional phenoldialcohols. The alkyl substituents of the alkyl substituted phenols may contain 1 to about 10 carbon atoms. Dimethylolphenols or phenolic resins, substituted in para-positions with alkyl groups containing 1 to about 10 carbon atoms are preferred. In one embodiment, a blend of octyl phenol and nonylphenol-formaldehyde resins are employed. The blend includes from about 25 to about 40% by weight octyl phenol and from about 75 to about 60% by weight nonylphenol, more preferably, the blend includes from about 30 to about 35 weight percent octyl phenol and from about 70 to about 65 weight percent nonylphenol. In one embodiment, the blend includes about 33% by weight octylphenol-formaldehyde and about 67% by weight nonylphenol formaldehyde resin, where each of the octylphenol and nonylphenol include methyl groups. This blend can be solubilized in paraffinic oil at about 30% solids.

Useful phenolic resins may be obtained under the tradenames SP-1044™, SP-1045™ (Schenectady International; Schenectady, N.Y.), which may be referred to as alkylphenol-formaldehyde resins. SP-1045 is believed to be an octylphenol-formaldehyde resin that contains methylol groups. The SP-1044 and SP-1045 resins are believed to be essentially free of halogen substituents or residual halogen compounds.

By essentially free of halogen substituents, it is meant that the synthesis of the resin provides for a non-halogenated resin that may only contain trace amounts of halogen containing compounds.

An example of a phenolic resin curative includes that defined according to the general formula

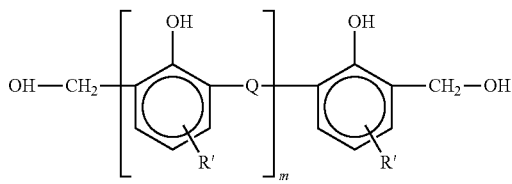

where Q is a divalent radical selected from the group consisting of —CH$_2$—, —CH$_2$—O—CH$_2$—; m is zero or a positive integer from 1 to 20 and R' is an organic group. In one embodiment, Q is the divalent radical —CH$_2$—O—CH$_2$—, m is zero or a positive integer from 1 to 10, and R' is an organic group having less than 20 carbon atoms. In other embodiments, m is zero or a positive integer from 1 to 5 and R' is an organic radical having between 4 and 12 carbon atoms.

The phenolic resin may be employed with a Lewis acid and a metal oxide. Lewis acids include stannous chloride. The stannous chloride can be used in its hydrous (SnCl$_2$.H$_2$O) or anhydrous (SnCl$_2$) form. The stannous chloride can be used in a powdered, granulated, or flake form. In one embodiment, metal oxide or acid reducing compound includes zinc oxide.

Free-radical cure agents include peroxides such as organic peroxides. Examples of organic peroxides include, but are not limited to, di-tert-butyl peroxide, dicumyl peroxide, t-butylcumyl peroxide, α,α-bis(tert-butylperoxy) diisopropyl benzene, 2,5-dimethyl-2,5-di(t-butylperoxy)hexane (DBPH), 1,1-di(tert-butylperoxy)-3,3,5-trimethyl cyclohexane, n-butyl-4-4-bis(tert-butylperoxy) valerate, benzoyl peroxide, lauroyl peroxide, dilauroyl peroxide, 2,5-dimethyl-2,5-di(tert-butylperoxy) hexyne-3, and mixtures thereof. Also, diaryl peroxides, ketone peroxides, peroxydicarbonates, peroxyesters, dialkyl peroxides, hydrdperoxides, peroxyketals and mixtures thereof may be used. Useful peroxides and their methods of use in dynamic vulcanization of thermoplastic vulcanizates are disclosed in U.S. Pat. No. 5,656,693.

The free-radical curative may be used in conjunction with a coagent. Useful coagents include high-vinyl polydiene or polydiene copolymer, triallylcyanurate, triallyl isocyanurate, triallyl phosphate, sulfur, N,N'-m-phenylenedimaleimide, N,N'-p-phenylenedimaleimide, divinyl benzene, trimethylol propane trimethacrylate, tetramethylene glycol diacrylate, trifunctional acrylic ester, dipentaerythritolpentacrylate, polyfunctional acrylate, retarded cyclohexane dimethanol diacrylate ester, polyfunctional methacrylates, acrylate and methacrylate metal salts, multi-functional acrylate esters, multi-functional methacrylate esters or a combination thereof, or oximers such as quinone dioxime.

Silicon-containing cure systems may include silicon hydride compounds having at least two SiH groups. Silicon hydride compounds that are useful in practicing the present invention include, but are not limited to, methylhydrogen polysiloxanes, methylhydrogen dimethyl-siloxane copolymers, alkyl methyl polysiloxanes, bis(dimethylsilyl)alkanes, bis(dimethylsilyl)benzene, and mixtures thereof.

Useful catalysts for hydrosilation include, but are not limited to, peroxide catalysts and catalysts including transition metals of Group VIII. These metals include, but are not limited to, palladium, rhodium, and platinum, as well as complexes of these metals. Useful silicon-containing curatives and cure systems are disclosed in U.S. Pat. No. 5,936,028.

Where butyl rubber is employed in preparing the thermoplastic vulcanizate, the cure systems may include phenolic resins, silicon-containing cure systems, zinc oxide systems, and amine systems. These cure systems are described in U.S. Pat. Nos. 5,013,793, 5,100,947, 5,021500, 5,100,947, 4,978,714, and 4,810,752.

Despite the fact that the rubber may be partially or fully cured, the compositions of this invention can be processed and reprocessed by conventional plastic processing techniques such as extrusion, injection molding, blow molding, and compression molding. The rubber within these thermoplastic elastomers can be in the form of finely-divided and well-dispersed particles of vulcanized or cured rubber within a continuous thermoplastic phase or matrix. In other embodiments, a co-continuous morphology or a phase inversion can be achieved. In those embodiments where the cured rubber is in the form of finely-divided and well-dispersed particles within the thermoplastic medium, the rubber particles can have an average diameter that is less than 50 μm, optionally less than 30 μm, optionally less than 10 μm, optionally less than 5 μm, and optionally less than 1 μm. In certain embodiments, at least 50%, optionally at least 60%, and optionally at least 75% of the particles have an average diameter of less than 5 μm, optionally less than 2 μm, and optionally less than 1 μm.

In one or more embodiments, the thermoplastic vulcanizate, prior to addition of the nanoclay and/or additional thermoplastic resin that are added after dynamic vulcanization, may be characterized by a Shore D Hardness, as determined according to ASTM D-2240 with a 5 second time interval, of less than 90, in other embodiments less than 80, in other embodiments less than 60, in other embodiments less than 50, and in other embodiments less than 40.

Nanoscale clays, which may also be referred to as nanoclays, include inorganic layered materials. These layered materials include those materials that exhibit intercalation capabilities. In one or more embodiments, these layered materials may be referred to as swellable layered clay materials. Intercalation, which may also be referred to as exfoliation, includes the fracturing of the layered structures into sheet-like structures. As a result, it is believed that the layered structures, which could be microscale-sized particles, are fractured into sheet-like structures having at least one nanoscale-sized dimension.

Swellable layered clay materials may include natural or synthetic phyllosilicates, such as smectic clays, including montmorillonite, smectite, illite, sepiolite, palygorskite, muscovite, allevardite, amesite, fluorohectorite, bentonite, fluorovermiculite, fluorine-containing synthetic varieties of talc, nontronite, beidellite, volkonskoite, laponite, hectorite, saponite, sauconite, magadite, kenyaite, stevensite and the like, as well as vermiculite, halloysite, aluminate oxides, hydrotalcite and the like. These layered clays may include a plurality of silicate platelets having a thickness of about 8-12 Å tightly bound together at interlayer spacings of 4 Å or less, and contain exchangeable cations such as Na$^+$, Ca$^{+2}$, K$^+$ or Mg$^{+2}$ present at the interlayer surfaces. One particular example of a synthetic clay includes magnesium sodium fluoride silicate.

In one or more embodiments, useful nanoscale clays include surface-modified clays, which also may be referred to as compatibilized clays or organophilic clays. Reference to nanoclays or nanoscale clays includes reference to those modified clays. It is believed that the modification improves the dispersibility of the clays within the polymers. Surface treatment may reduce the particle-particle attraction and promote dispersion of the clay particles within polymers. In one or more embodiments, the surface modification includes the interaction or reaction of the clay with an intercalant.

In one or more embodiments, the layered clay may be intercalated by treatment with organic molecules (swelling agents) capable of undergoing ion exchange reactions with the cations present at the interlayer surfaces of the layered silicate (e.g., cationic exchange). Suitable swelling agents include cationic surfactants such as ammonium (primary, secondary, tertiary and quaternary), phosphonium or sulfonium derivatives of aliphatic, aromatic or arylaliphatic amines, phosphines or sulfides. For example, intercalation may include treatments with quaternary ammonium salts. These salts may include dimethyldialkyl ammonium salts such as dimethylditallowammonium salts and hydrogenated salts such as dihydrogenated dimethyltallow ammonium salts and dimethyl, hydrogenated tallow, 2-ethylhexyl quaternary ammonium salts.

Another class of swelling agents include those which can be covalently bonded to the interlayer surfaces. These include polysilanes of the structure —Si(R')R$^2$R$^2$ where R$^1$ is the same or different at each occurrence and is selected from alky, alkoxy or oxysilane and R$^2$ is an organic radical compatible with the matrix polymer of the composite.

Other suitable swelling agents include protonated amino acids and salts thereof containing 2-30 carbon atoms such as 12-aminododecanoic acid, epsilon-caprolactam and like materials.

Still other methods of intercalation include onium ion modification and ion-dipole interaction. Onium ion modification forms a clay-chemical complex using an intercalant surface modifier containing an ammonium or phosphonium functional group. The functional group is believed to ionically bond to the nanoclay surface, which converts the surface from a hydrophilic to an organophilic species. The ion-dipole interaction method is believed to also form a clay-chemical complex by coordinating sodium ions on the surface of the nanoclay via ion-dipole interaction.

Treatment with the swelling agents described above is believed to result in intercalation of the layered platelets as a consequence of a reduction of the ionic forces holding the layers together and introduction of molecules between layers, which is believed to space the layers at distances of greater than 4 Å, or even greater than 9 Å. This separation is believed to allow the layered silicate to more readily absorb polymerizable monomer material and polymeric material between the layers and facilitates further delamination of the layers when the intercalate is shear mixed with matrix polymer material to provide a uniform dispersion of the exfoliated layers within the polymer matrix.

In one or more embodiments, useful nanoclays include inorganic compounds that upon exfoliation may be characterized by having at least one dimension that is smaller than a micron (micrometer). For example, these sheet-like structures that have at least one dimension that is less than $1 \times 10^{-6}$ meters, in other embodiments less than $1 \times 10^{-8}$ meters, in other embodiments less than $9 \times 10^{-9}$ meters, and even in other embodiments less than $5 \times 10^{-9}$ meters. These sheet-like structures may also have a relatively high aspect ratio. In other words, one dimension is typically much larger than another dimension; e.g., length is much larger than height (i.e., thickness). For example, the average aspect ratio of the particle may be greater than 50, in other embodiments greater than 60, and even in other embodiments greater than 70. In certain embodiments, the exfoliated nanoclays may characterized by having a sheet-like structure, which refers to a shape having a height (i.e., thickness) that is much smaller than the width and length of the particle. In one or more embodiments, these particles have a height (i.e., thickness) that is from about 0.1 nm to about 9 nm, in other embodiments from about 1 nm to about 8 nm, and even in other embodiments from about 2 nm to about 7 nm; and the length or width (i.e., surface dimensions) may be from about 1 μm to about 15 μm, in other embodiments from about 2 μm to about 13 μm, and even in other embodiments from about 3 μm to about 10 μm.

Commercially available surface-treated nanoclays include Nanomer™ C44PA, I44PA (Nanocor Inc.; Illinois). They are also available under the tradename Cloisite™ 20A (Southern Clay Products; Texas), which is believed to be modified with dimethyl, dehydrogenated tallow, quaternary ammonium and contain a chloride anion, Cloisite™ 10A, which is believed to be modified with dimethyl, benzyl, hydrogenated tallow, quaternary ammonium and contains a chloride anion, Cloisite 93A, which is believed to be modified with methyl, dehydrogenated tallow ammonium, 30B, which is believed to be modified with methyl, tallow, bis-2-hydroxyethyl, quaternary ammonium, and Cloisite™ 25A, which is believed to be modified with dimethyl, hydrogenated tallow, 2-ethylhexyl quaternary ammonium. Others include Nanofil™ 948 and Nanofil™ 919 (süd Chemie), which are surface modified with dimethyl hydrogenated ditallaw quaternary ammonium ions and dimethyl hydrogenated tallow-benzyl-quaternary ammonium ions, respectively. Still others include surface-modified hydrotalcites (Akzo Nobel). Synthetic clays are available under the tradename SOMASIF™ MAE (CO-OP Chemical Co. Ltd.), which is believed to include about 60-70% magnesium sodium fluoride silicate and 30-40,% dihydrogenated tallow dimethyl ammonium ion.

The functionalized thermoplastic polymer, which may also be referred to as a functionalized thermoplastic resin, includes at least one functional group. The functional group, which may also be referred to as a functional substituent or functional moiety, includes a hetero atom. In one or more embodiments, the functional group includes a polar group. Examples of polar groups include hydroxy, propoxy, carbonyl, ether, halide, amine, imine, and nitrile groups. Exemplary groups containing a carbonyl moiety include carboxylic acid, anhydride, ketone, acid halide, ester, amide, or imide groups, and derivatives thereof. In one embodiment, the functional group includes a succinic anhydride group, or the corresponding acid, which may derive from a reaction (e.g., polymerization or grafting reaction) with maleic anhydride, or a β-alkyl substituted propanoic acid group or derivative thereof. In one or more embodiments, the functional group is pendant to the backbone of the hydrocarbon polymer.

In one or more embodiments, the functionalized thermoplastic polymer may be prepared by grafting a graft monomer to a thermoplastic polymer. The process of grafting may include combining, contacting, or reacting a thermoplastic polymer with a graft monomer. These functionalized thermoplastic polymers include those described in U.S. Pat. Nos. 4,957,968, 5,624,999, and 6,503,984.

The thermoplastic polymer that can be grafted with the graft monomer may include solid, generally high molecular weight plastic materials. These plastics include crystalline and semi-crystalline polymers. In one or more embodiments, these thermoplastic polymers may be characterized by a crystallinity of at least 20%, in other embodiments at least 25%, and in other embodiments at least 30%. Crystallinity may be determined by dividing the heat of fusion of a sample by the heat of fusion of a 100% crystalline polymer, which is assumed to be 209 joules/gram for isotactic polypropylene or 350 joules/gram for polyethylene. Heat of fusion can be determined by differential scanning calorimetry. In these or other embodiments, the thermoplastic polymers to be functionalized may be characterized by having a heat of fusion of at least 40 J/g, in other embodiments in excess of 50 J/g, in other embodiments in excess of 75 J/g, in other embodiments in excess of 95 J/g, and in other embodiments in excess of 100 J/g.

In one or more embodiments, the thermoplastic polymers, prior to grafting, may be characterized by a weight average molecular weight ($M_w$) of from about 100 kg/mole to about 2,000 kg/mole, and in other embodiments from about 300 kg/mole to about 600 kg/mole. They may also be characterized by a number-average molecular weight ($M_n$) of about 80 kg/mole to about 800 kg/mole, and in other embodiments about 90 kg/mole to about 200 kg/mole. Molecular weight may be determined by size exclusion chromatography (SEC) by using a Waters 150 gel permeation chromatograph equipped with the differential refractive index detector and calibrated using polystyrene standards.

In one or more embodiments, these thermoplastic polymers, prior to grafting, may be characterized by a melt flow of from about 0.3 to about 2,000 dg/min, in other embodiments from about 0.5 to about 1,000 dg/min, and in other embodiments from about 1 to about 1,000 dg/min, per ASTM D-1238 at 230° C. and 2.16 kg load.

In one or more embodiments, these thermoplastic resins, prior to grafting, may have a melt temperature ($T_m$) that is from about 110° C. to about 250° C., in other embodiments from about 120 to about 170° C., and in other embodiments from about 130° C. to about 165° C. In one or more embodiments, they may have a crystallization temperature ($T_c$) of these optionally at least about 75° C., in other embodiments at least about 95° C., in other embodiments at least about 100° C., and in other embodiments at least 105° C., with one embodiment ranging from 105° to 115° C.

Exemplary thermoplastic polymers that may be grafted include polyolefins, polyolefin copolymers, and non-olefin thermoplastic polymers. Polyolefins may include those thermoplastic polymers that are formed by polymerizing ethylene or α-olefins such as propylene, 1-butene, 1-hexene, 1-octene, 2-methyl-1-propene, 3-methyl-1-pentene, 4-methyl-1 pentene, 5-methyl-1-hexene, and mixtures thereof. Copolymers of ethylene and propylene and ethylene and/or propylene with another x-olefin such as 1-butene, 1-hexene, 1-octene, 2-methyl-1-propene, 3-methyl-1-pentene, 4-methyl-1-pentene, 5-methyl-1-hexene or mixtures thereof is also contemplated. Other polyolefin copolymers may include copolymers of olefins with styrene such as styrene-ethylene copolymer or polymers of olefins with α,β-unsaturated acids, α,β-unsaturated esters such as polyethylene-acrylate copolymers. Non-olefin thermoplastic polymers may include polymers and copolymers of styrene, α,β-unsaturated acids, α,β-unsaturated esters, and mixtures thereof. For example, polystyrene, polyacrylate, and polymethacrylate may be functionalized.

These homopolymers and copolymers may be synthesized by using an appropriate polymerization technique known in the art. These techniques may include conventional Ziegler-Natta, type polymerizations, catalysis employing single-site organometallic catalysts including, but not limited to, metallocene catalysts, and high-pressure free radical polymerizations.

The degree of functionalization of the functionalized thermoplastic polymer may be recited in terms of the weight percent of the pendent functional moiety based on the total weight of the functionalized polymer. In one or more embodiments, the functionalized thermoplastic polymer may include at least 0.2% by weight, in other embodiments at least 0.4% by weight, in other embodiments at least 0.6% by weight, and in other embodiments at least 1.0 weight percent functionalization. In these or other embodiments, the functionalized thermoplastic polymers may include less than 5% by weight, in other embodiments less than 3% by weight, and in other embodiments less than 2% by weight functionalization.

In one or more embodiments, where the functionalized thermoplastic polymer is a functionalized propylene-based polymer, it can be characterized by a melt flow rate of from about 20 to about 2,000 dg/min, in other embodiments from about 100 to about 1,500 dg/min, and in other embodiments from about 150 to about 750 dg/min, per ASTM D-1238 at 230° C. and 2.16 kg load. In one or more embodiments, where the functionalized thermoplastic polymer is a functionalized ethylene-based polymer, it can be characterized by a melt flow index of from about 0.2 to about 2,000 dg/min, in other embodiments from about 1 to about 1,000 dg/min, and in other embodiments from about 5 to about 100 dg/min, per ASTM D-1238 at 190° C. and 2.16 kg load.

Functionalized thermoplastic polymers are commercially available. For example, maleated propylene-based polymers may be obtained under the tradename FUSABOND™ (DuPont), POLYBOND™ (Crompton), EXXELOR™ (ExxonMobil), or EPOLENE™ (Eastman).

In one or more embodiments, other materials that may be introduced after dynamic vulcanization include amines, silanes, and mixtures thereof. In these or other embodiments, amines, silanes, and mixtures thereof may also be introduced prior to dynamic vulcanization. In other words, these materials may be present in the thermoplastic vulcanizate feed stock.

In one or more embodiments, the nanoclay may be introduced with a thermoplastic polymer prior to introduction with the thermoplastic vulcanizate. In other words, a nanoclay-polymer masterbatch is formed, and the masterbatch is introduced to the thermoplastic vulcanizate after dynamic vulcanization.

The thermoplastic polymer with which the nanoclay may be masterbatched may include a functionalized thermoplastic polymer, a non-functionalized thermoplastic polymer, or a mixture thereof. Also, the masterbatch may include other constituents that may be added to the thermoplastic vulcanizate such as, but not limited to, antioxidants, fillers, oils, antidegradants, and mixtures thereof.

The amount of nanoclay that may be present within the masterbatch may vary depending upon the desired properties. In one or more embodiments, the masterbatch may include from about 20 to about 80 percent by weight, in other embodiments from about 40 to about 70 percent by weight, and in other embodiments from about 50 to about 60 percent by weight nanoclay, based upon the total weight of the masterbatch.

Where a functionalized thermoplastic polymer is included within the masterbatch, the amount included may likewise vary based upon the desired properties. In one or more embodiments, the masterbatch may include from about 20 to about 80 percent by weight, in other embodiments from about 60 to about 70 percent by weight, and in other embodiments from about 50 to about 60 percent by weight functionalized thermoplastic polymer, based upon the total weight of the masterbatch.

According to one or more embodiments of the present invention, thermoplastic vulcanizate and nanoclay are introduced after dynamic vulcanization of the rubber within the thermoplastic vulcanizate. In addition to the nanoclay, a functionalized thermoplastic resin may also be introduced after dynamic vulcanization. In yet other embodiments, a non-functionalized thermoplastic resin, an oil, a mixture thereof, or other ingredients that are commonly employed in manufacturing thermoplastic vulcanizates, may be introduced after dynamic vulcanization.

As noted above, dynamic vulcanization includes the vulcanization of rubber while undergoing mixing with a thermoplastic resin. The vulcanization typically occurs at temperatures above the melt temperature of the thermoplastic resin. Inasmuch as the introduction of thermoplastic vulcanizate and nanoclay occurs after dynamic vulcanization, this introduction may occur after the thermoplastic vulcanizate has been cooled and/or fabricated. For example, the thermoplastic vulcanizate may be prepared, cooled, and pelletized, and the pellets, either in their solid state or after melting, can be introduced to the nanoclay (e.g., the nanoclay can be added to the thermoplastic vulcanizate).

In other embodiments, the introduction of thermoplastic vulcanizate and nanoclay can occur while the thermoplastic vulcanizate remains in its melt state following dynamic vulcanization. Inasmuch as dynamic vulcanization may include a cure progression from initial cure to full cure (i.e., complete cure), the introduction of the nanoclay may occur at various stages following initial cure.

For purposes of this specification, the phrase after dynamic vulcanization refers to a point in time after the onset of dynamic vulcanization. In one or more embodiments, the introduction of the nanoclay occurs after full or complete cure. Full or complete cure may be quantified based upon consumption of the curative. For example, the nanoclay may be introduced after 80% consumption, in other embodiments after 90% consumption, and in other embodiments after 99% consumption of the curative. In certain embodiments, introduction of the nanoclay occurs after total consumption of the curative.

In other embodiments, the introduction of the nanoclay may occur after phase inversion of the rubber. As those skilled in the art appreciate, dynamic vulcanization may include a phase inversion whereby the rubber inverts from the continuous phase of the blend to the discontinuous phase of the blend. This may occur even though the rubber may comprise a major volume fraction of the initial blend. Phase inversion of the rubber phase of thermoplastic vulcanizates is described in International Publication No. WO 2005/028555.

In one or more embodiments, the amount of nanoclay introduced to the thermoplastic vulcanizate after dynamic vulcanization may include at least 2% by weight, in other embodiments at least 3% by weight, and in other embodiments at least 4% by weight of the total weight of the finished product (i.e., the nanoclay-filled thermoplastic vulcanizate); in these or other embodiments, the amount of nanoclay introduced to the thermoplastic vulcanizate may be less than 20% by weight, in other embodiments less than 15% by weight, and in other embodiments less than 10% by weight of the total weight of the nanoclay-filled thermoplastic vulcanizate.

In one or more embodiments, the amount of functionalized thermoplastic resin introduced to the thermoplastic vulcanizate after dynamic vulcanization may include at least 4% by weight, in other embodiments at least 6% by weight, and in other embodiments at least 8% by weight of the total weight of the nanoclay-filled thermoplastic vulcanizate; in these or other embodiments, the amount of functionalized thermoplastic resin introduced to the thermoplastic vulcanizate may be less than 40% by weight, in other embodiments less than 15% by weight, and in other embodiments less than 10% by weight of the total weight of the nanoclay-filled thermoplastic vulcanizate.

In one or more embodiments, the amount of non-functionalized thermoplastic resin introduced to the thermoplastic vulcanizate after dynamic vulcanization may be from about 0 to about 80% by weight, in other embodiments from about 20 to about 60% by weight, and in other embodiments from about 30 to about 50% by weight, of the total amount of the nanoclay-filled thermoplastic vulcanizate.

In one or more embodiments, the amount of oil introduced to the thermoplastic vulcanizate after dynamic vulcanization may be from about 0 to about 20% by weight, in other embodiments from about 2 to about 18% by weight, and in other embodiments from about 5 to about 12% by weight of the total weight of the nanoclay-filled thermoplastic vulcanizate.

Where an amine and/or silane is added, the amine and/or silane may be added in an amount from about 0 to about 15 parts by weight, in other embodiments from about 1 to about 10 parts by weight, and in other embodiments from about 1.5 to about 5 parts by weight per 100 parts by weight rubber.

The conditions at which the nanoclay and the thermoplastic vulcanizate are introduced may vary based upon the equipment used to introduce the materials. For example, the nanoclay and the thermoplastic vulcanizate may be introduced at elevated temperatures such as at a temperature where the thermoplastic vulcanizate is in its melt phase at the moment of introduction. Inasmuch as the nanoclay may be surface modified or treated, it may be advantageous to introduce the nanoclay at a temperature below the temperature at which the modified nanoclay decomposes. In other words, the intercalants reacted or interacted with the nanoclay may separate from or degrade at certain temperatures, and therefore it may be advantageous to maintain the temperature of the modified clay, particularly at the time of introduction with the thermoplastic vulcanizate, at temperatures below the decomposition temperature of the nanoclay complementary intercalant. In one or more embodiments, the thermoplastic vulcanizate may be dried prior to introducing the nanoclay. Conventional techniques for drying thermoplastic vulcanizates may be employed. In one or more embodiments, the thermoplastic vulcanizate is dried to an extent where a constant weight is achieved. In these or other embodiments, the other ingredients that are added after dynamic vulcanization (e.g., the nanoclay and the functionalized thermoplastic resin) may also be dried, including drying to an extent where a constant weight is achieved.

In one or more embodiments, the temperature of the thermoplastic vulcanizate at the moment the nanoclay is introduced may be from about 155° C. to about 185° C., in other embodiments from about 160° C. to about 180° C., and in other embodiments from about 165° C. to about 175° C.

In these or other embodiments, the nanoclay and thermoplastic vulcanizates may be introduced within an inert atmosphere such as may be achieved under a nitrogen blanket. If introduced after dynamic vulcanization, the other ingredients (e.g., the functionalized thermoplastic resin) may be introduced under similar conditions.

The order of introducing the various constituents to the thermoplastic vulcanizate can be varied. In one or more embodiments, the nanoclay can be added first, followed by the addition of the other constituents (e.g., functionalized thermoplastic resin).

Once the nanoclay and thermoplastic vulcanizate are introduced, they may be blended or mixed. This blending or mixing may be accomplished by employing conventional techniques within conventional mixing equipment. The mixing equipment may include the same equipment in which the thermoplastic vulcanizate and the nanoclay are introduced. In one or more embodiments, mixing may continue under an inert atmosphere such as may be achieved under a nitrogen blanket.

In one or more embodiments, mixing may take place at a temperature sufficient to achieve a homogeneous melted mass, but below the degradation temperature of the intercalant. In certain embodiments, mixing takes place at a temperature from about 150° C. to about 200° C., in other embodiments from about 155° C. to about 185° C., in other embodiments from about 160° C. to about 180° C., and in other embodiments from about 165° C. to about 175° C.

In one or more embodiments, mixing may take place for a time sufficient to achieve a homogeneous blend. In certain embodiments, mixing may take place for a time sufficient to achieve a desired level of nanoclay exfoliation. As those skilled in the art appreciate, mixing times may vary based upon the type of equipment employed. In those embodiments where an internal mixer (e.g., Brabender) is employed, mixing can continue for at least 5 minutes, in other embodiments for at least 10 minutes, and in other embodiments for at least 15 minutes. Where a reactive mixer is employed (e.g., twin screw extruder), the residence time within the mixer may be at least 0.5 minute, in other embodiments at least 1.0 minutes, and in other embodiments at least 1.5 minutes.

Once desired mixing of the thermoplastic vulcanizate and nanoclay has taken place, the composition can be fabricated by using conventional thermoplastic resin fabrication techniques. For example, the composition can be cooled and pelletized.

In one or more embodiments, the compositions prepared according to the present invention may be characterized by an advantageous balance between stiffness (as may be represented by flexural modulus) and weight (as may be represented by specific gravity).

The thermoplastic elastomers of this invention are useful for making a variety of articles such as weather seals, hoses, belts, gaskets, moldings, boots, elastic fibers and like articles. They are particularly useful for making articles by blow molding, extrusion, injection molding, thermo-forming, elasto-welding and compression molding techniques. More specifically, they are useful for making vehicle parts such as weather seals, brake parts such as cups, coupling disks, and diaphragm cups, boots for constant velocity joints and rack and pinion joints, tubing, sealing gaskets, parts of hydraulically or pneumatically operated apparatus, o-rings, pistons, valves, valve seats, valve guides, and other elastomeric polymer based parts or elastomeric polymers combined with other materials such as metal/plastic combination materials. Also contemplated are transmission belts including V-belts, toothed belts with truncated ribs containing fabric faced V's, ground short fiber reinforced V's or molded gum with short fiber flocked V's.

EXAMPLES

Samples 1-4

Four samples were prepared by introducing various ingredients to a thermoplastic vulcanizate within a Brabender mixer. The mixer was set at a temperature of 160° C., and pellets of dried thermoplastic vulcanizate were added to the mixer. Once the pellets of thermoplastic vulcanizate were melted, the other ingredients were added to the mixer.

The thermoplastic vulcanizate was prepared by using conventional techniques using large-scale manufacturing equipment. The ingredients employed to prepare the thermoplastic vulcanizate included 100 parts by weight of elastomeric copolymer (this amount refers only to the rubber component even though the stock included 100 parts by weight rubber and 90 parts by weight oil), about 4.2 parts by weight phenolic curative; about 130 total parts by weight paraffinic oil (130 parts including the 90 parts inclusive with the rubber), about 42 parts by weight clay, about 4.26 parts by weight wax, about 2 parts by weight zinc oxide, about 1.26 parts by weight tin chloride, about 162 parts by weight thermoplastic resin (0.7 MFR), and about 10 parts by weight carbon black.

The ingredients that were added to the mixer are identified in Table I, together with results of various tests that were performed on the resulting composition. Table I also provides the actual temperature of the composition as it was removed from the mixer. The amounts provided in table I, as well as other tables in the specification, are provided in percent by weight unless otherwise specified. The samples that are comparative samples have been designated with the letter "C" and those that are within the invention have been labeled with the letter "I."

TABLE I

|  | Sample | | | |
| --- | --- | --- | --- | --- |
|  | 1 | 2 | 3 | 4 |
| Invention/Comparative | C | C | I | C |
| Ingredients | | | | |
| Thermoplastic Vulcanizate | 86.00 | 86.00 | 86.00 | 86.00 |
| Unfunctionalized Polypropylene | 11.50 | 6.50 | 6.50 | 11.50 |
| Maleated Polypropylene | — | 5.00 | 5.00 | — |
| Conventional Clay | 2.50 | 2.50 | — | — |
| Nanoclay | | | 2.50 | 2.50 |
| Total | 100 | 100 | 100 | 100 |
| Melt Temp., @, Dump, (° C.) | 173 | 172 | 171 | 171 |
| Hardness; ASTM, Sh.A.(D) | 88 (41) | 90 (42) | 90 (41) | 91 (41) |
| Specific Gravity | 0.971 | 0.970 | 0.969 | 0.964 |
| Ultimate Tensile Strength (MPa) | 12.03 | 11.45 | 14.00 | 10.89 |
| Ultimate Elongation (%) | 446 | 354 | 474 | 324 |
| M100 (MPa) | 8.38 | 9.29 | 9.75 | 8.33 |
| Tension Set (%) | 40.0 | 36.0 | 40.0 | 42.0 |
| Weight Gain (%) | 42 | 56 | 50 | 54 |

The unfunctionalized polypropylene was characterized by an MFR of about 0.7 dg/min, and was obtained under the tradename 51SO7A™ (Equistar), now referred to as F008™ (Sunoco). The maleated polypropylene was characterized by an MFR of about 200 dg/min, an $M_n$ or about 24,800 g/mole, an $M_w$ of about 47,000 g/mole, is believed to have been prepared by reacting about 6.3 moles of maleic anhydride per mole of polymer, and was obtained under the tradename EPOLENE™ G-3015 (Eastman). The conventional clay was obtained under the tradename Icecap™ K (Burgess). The nanoclay was obtained under the tradename CLOISITE™ 6A, and is believed to include montmorillonite treated with an alkyl quaternary ammonium salt.

Shore hardness was determined according to ISO 868 with a 15 second interval and/or per ASTM D-2240 with a 5 second time interval. Ultimate tensile strength, ultimate elongation, and 100% modulus (M100) were determined according to ASTM D-412 at 23° C. by using an Instron testing machine. Weight gain was determined according to ASTM D-471. Tension set was determined according to ASTM D-412. Specific gravity was determined by ASTM D-297. All testing of Brabender-batch samples was performed on compression molded plaques; the thickness of the plaques was 1.5-2.0 mm.

The data in Table I shows that Sample 3, which includes both functionalized thermoplastic resin and nanoclay, has improved stiffness (e.g., M100) and ultimate tensile and elongation properties as compared to the other samples.

Samples 5-19

Fifteen additional samples were prepared by using techniques similar to those set forth for Samples 1-4. It is noted, particularly in order to draw a distinction between subsequent samples, that the Brabender was operated without an inert blanket. Also, the mixer temperature was set at 155° C. The ingredients that were introduced to the thermoplastic vulcanizate are set forth in Table II along with the data obtained from various tests performed on the resulting compositions. In certain samples, a blend of high-MFR and low-MFR polypropylene were used. Also, certain samples employed a masterbatch including a nanoclay The thermoplastic vulcanizate was prepared by using conventional techniques within large-scale manufacturing equipment and ingredients that included 100 parts by weight of elastomeric copolymer (this amount refers only to the rubber component even though the stock included 100 parts by weight rubber and 75 parts by weight oil), about 4.4 parts by weight phenolic curative, about 135 total parts by weight paraffinic oil (135 parts including the 75 parts inclusive with the rubber), about 12 parts by weight clay, about 3.4 parts by weight wax, about 2 parts by weight zinc oxide, about 1.26 parts by weight tin chloride, about 51 parts by weight thermoplastic resin (0.8 MFR), and about 10 parts by weight carbon black.

TABLE II

| | Sample | | | | | | | |
|---|---|---|---|---|---|---|---|---|
| | 5 | 6 | 7 | 8 | 9 | 10 | 11 | 12 |
| Invention/Comparative | C | C | I | I | I | I | I | I |
| Ingredients | % | % | % | % | % | % | % | % |
| Thermoplastic Vulcanizate | 60.00 | 60.00 | 60.00 | 60.00 | 60.00 | 60.00 | 60.00 | 60.00 |
| Unfunctionalized Polypropylene (Low-MFR) | — | 27.84 | 27.84 | 27.84 | 25.60 | 27.84 | — | — |
| Unfunctionalized Polypropylene (High-MFR) | — | 7.68 | — | — | — | — | — | — |
| Maleated Polypropylene | — | — | 7.68 | 7.68 | 5.44 | 7.68 | — | — |
| Conventional Clay | — | 2.36 | — | — | — | — | — | — |
| Parrafinic Oil | — | 2.12 | — | — | — | — | — | — |
| Nanoclay Masterbatch I | 40.00 | — | — | — | — | — | 40.00 | — |
| Nanoclay Masterbatch II | — | — | — | — | — | — | — | 40.00 |
| NanoClay masterbatch III | — | — | — | — | 8.96 | — | — | — |
| Treated Nanoclay I | — | — | 4.48 | — | — | — | — | — |
| Treated Nanoclay II | — | — | — | 4.48 | — | — | — | — |
| Treated Nanoclay III | — | — | — | — | — | 4.48 | — | — |
| Melt Temp., @, Dump, (° C.) | 175 | 171 | 176 | 180 | 175 | 179 | 174 | 175 |
| Hardness; ASTM, Shore D | 41 | 40 | 43 | 44 | 44 | 44 | 48 | 49 |
| Specific Gravity | 0.935 | 0.935 | 0.933 | 0.942 | 0.936 | 0.941 | 0.935 | 0.940 |
| Ultimate Tensile Strength (MPa) | 10.44 | 8.43 | 8.99 | 10.53 | 11.96 | 11.84 | 10.61 | 10.10 |
| Ultimate Elongation (%) | 234 | 94 | 64 | 208 | 274 | 228 | 224 | 146 |
| M100 (MPa) | 9.47 | n/a | n/a | 9.65 | 10.23 | 10.58 | 10.39 | 9.49 |
| Wt. Gain (%); 24 h @ 121° C. | 52 | 46 | 51 | 48 | 49 | 47 | 47 | 50 |
| Tension Set (%) | 38 | 35 | 35 | 38 | — | — | 40 | 38 |

| | Sample | | | | | | |
|---|---|---|---|---|---|---|---|
| | 13 | 14 | 15 | 16 | 17 | 18 | 19 |
| Invention/Comparative | C | I | I | I | I | I | I |
| Ingredients | % | % | % | % | % | % | % |
| Thermoplastic Vulcanizate | 59.00 | 59.00 | 59.00 | 59.00 | 59.00 | 59.00 | 59.00 |
| Unfunctionalized Polypropylene (Low-MFR) | 27.84 | 27.84 | 27.84 | 25.60 | 27.84 | — | — |
| Unfunctionalized Polypropylene (High-MFR) | 7.68 | — | — | — | — | — | — |
| Maleated Polypropylene | — | 7.68 | 7.68 | 5.44 | 7.68 | — | — |
| Conventional Clay | 2.36 | — | — | — | — | — | — |
| Paraffinic Oil | 2.12 | — | — | — | — | — | — |
| Nanoclay Masterbatch I | — | — | — | — | — | 40.00 | — |
| Nanoclay Masterbatch II | — | — | — | — | — | — | 40.00 |
| Nanoclay masterbatch III | — | — | — | 8.96 | — | — | — |
| Treated Nanoclay I | — | 4.48 | — | — | — | — | — |
| Treated Nanoclay II | — | — | 4.48 | — | — | — | — |
| Treated Nanoclay III | — | — | — | — | 4.48 | — | — |
| Melt Temp., @, Dump, (° C.) | 174 | 178 | 179 | 179 | 178 | 176 | 174 |
| Hardness; ASTM, Shore D | 46 | 46 | 48 | 48 | 47 | 46 | 47 |
| Specific Gravity | 0.934 | 0.936 | 0.942 | 0.944 | 0.937 | 0.935 | 0.943 |
| Ultimate Tensile Strength (MPa) | 8.20 | 9.30 | 11.32 | 10.54 | 11.36 | 10.69 | 10.24 |
| Ultimate Elongation (%) | 98 | 102 | 246 | 201 | 272 | 315 | 182 |
| M100 (MPa) | 0.00 | 0.00 | 10.23 | 9.70 | 9.86 | 9.21 | 9.61 |
| Wt. Gain (%); 24 h @ 121° C. | 44 | 49 | 45 | 45 | 46 | 47 | 49 |
| Tension Set (%) | — | — | 40 | 41 | 40 | 38 | — |

The high-MFR unfunctionalized polypropylene was characterized by a 700 MFR, and was obtained under the tradename Achieve 3925G™ (ExxonMobil). The low-MFR unfunctionalized polypropylene was characterized by a 5 MFI, and was obtained under the tradename PF1043N™ (ExxonMobil).

Treated nanoclay I included 53 weight percent montmorillonite clay and 47 weight percent dimethylditallowammonium salt, and was obtained under the tradename CLOISITE™ 6A (South China Clay). Treated nanoclay II included about 70 weight percent montmorillonite clay and about 30 weight percent octadecylamine and was obtained under the tradename Nanomer™ 130 P (Nanocor). Treated nanoclay III included about 70 weight percent montmorillonite clay and about 30 weight percent dimethyldialkylammonium and was obtained under the tradename Nanomer™ 44 PA (Nanocor).

Nanoclay Master Batch I included about 69 weight percent polypropylene, about 11 weight percent Cloisite 6A, about 19 weight percent maleated polypropylene, and about 0.2 percent by weight. Irganox 1010. Nanoclay Master Batch II includes about 70 percent by weight polypropylene, about 11 percent by weight Somasif synthetic clay (60-70% magnesium sodium fluoride silicate and 30-40% dehydrogenated talowdimethyl ammonium ion), about 19 percent by weight maleated polypropylene, and about 0.2 percent irganox 1010. Nanoclay Master Batch III included about 50 percent by weight 144PA nanoclay, about 25 percent by weight maleated polypropylene, and about 25 percent by weight polypropylene.

The data in Table II confirms the previous data that nanoclay-filled thermoplastic vulcanizates have an overall improved balance of properties, particularly a balance between stiffness (e.g., M100) and specific gravity, as compared to the comparative samples. Notably, these trends were seen over various loadings of the ingredients.

Samples 20-37

Eighteen additional samples were prepared by using techniques similar to those set forth in the preceding samples, except that the introduction and mixing of the thermoplastic vulcanizate and other ingredients took place under a nitrogen blanket. As with the previous samples, the Brabender was set at a temperature of 155° C. The ingredients that were employed in these samples, including the thermoplastic vulcanizate, were similar to those used in the preceding samples.

The ingredients, their amounts, and the data obtained from various tests are set forth in Table III.

TABLE III

| | Sample | | | | | | | | |
|---|---|---|---|---|---|---|---|---|---|
| | 20 | 21 | 22 | 23 | 24 | 25 | 26 | 27 | 28 |
| Invention/Comparative | I | C | C | I | I | I | I | I | I |
| Ingredients | % | % | % | % | % | % | % | % | % |
| Thermoplastic Vulcanizate | 60.00 | 60.00 | 60.00 | 60.00 | 60.00 | 60.00 | 60.00 | 60.00 | 60.00 |
| Unfunctionalized Polypropylene (Low-MFR) | — | 27.84 | 35.52 | 27.84 | 27.84 | 25.60 | 27.84 | — | — |
| Unfunctionalized Polypropylene (High-MFR) | — | 7.68 | — | — | — | — | — | — | — |
| Maleated Polypropylene | — | — | — | 7.68 | 7.68 | 5.44 | 7.68 | — | — |
| Conventional Clay | — | 2.36 | 2.36 | — | — | — | — | — | — |
| Parrafinic Oil | — | 2.12 | 2.12 | — | — | — | — | — | — |
| Nanoclay Masterbatch I | 40.00 | — | — | — | — | — | — | 40.00 | — |
| Nanoclay Masterbatch II | — | — | — | — | — | — | — | — | 40.00 |
| Nanoclay Masterbatch III | — | — | — | — | — | 8.96 | — | — | — |
| Treated Nanoclay I | — | — | — | 4.48 | — | — | — | — | — |
| Treated Nanoclay II | — | — | — | — | 4.48 | — | — | — | — |
| Treated Nanoclay III | — | — | — | — | — | — | 4.48 | — | — |
| Melt Temp., @, Dump, (° C.) | 171 | 160 | 162 | 175 | 165 | 163 | 164 | 172 | 163 |
| Hardness; ASTM, Shore D | 46 | 45 | 45 | 46 | 46 | 47 | 46 | 47 | 47 |
| Specific Gravity | 0.936 | 0.935 | 0.936 | 0.935 | 0.943 | 0.946 | 0.939 | 0.936 | 0.944 |
| Ultimate Tensile Strength (MPa) | 10.66 | 9.18 | 9.11 | 11.87 | 11.06 | 12.31 | 11.12 | 10.92 | 11.28 |
| Ultimate Elongation (%) | 249 | 166 | 164 | 341 | 229 | 337 | 256 | 319 | 290 |
| M100 (MPa) | 9.42 | 8.74 | 8.67 | 9.56 | 9.87 | 9.97 | 9.86 | 9.29 | 9.65 |
| Tension Set (%) | 37.5 | 37 | 35 | 37.5 | 37 | 39 | 39 | 39 | 41 |
| Wt. Gain (%) | 53 | 47 | 43 | 52 | 49 | 50 | 49 | 49 | 55 |

| | Sample | | | | | | | | |
|---|---|---|---|---|---|---|---|---|---|
| | 29 | 30 | 31 | 32 | 33 | 34 | 35 | 36 | 37 |
| Invention/Comparative | I | C | C | I | I | I | I | I | I |
| Ingredients | % | % | % | % | % | % | % | % | % |
| Thermoplastic Vulcanizate | 60.00 | 60.00 | 60.00 | 60.00 | 60.00 | 60.00 | 60.00 | 60.00 | 60.00 |
| Unfunctionalized Polypropylene (Low-MFR) | — | — | 27.84 | 35.52 | 27.84 | 27.84 | 25.60 | 27.84 | — |
| Unfunctionalized Polypropylene (High-MFR) | — | — | 7.68 | — | — | — | — | — | — |
| Maleated Polypropylene | — | — | — | 7.68 | 7.68 | 5.44 | 7.68 | — | — |
| Conventional Clay | — | 2.36 | 2.36 | — | — | — | — | — | — |
| Parrafinic Oil | — | 2.12 | 2.12 | — | — | — | — | — | — |
| Nanoclay Masterbatch I | 40.00 | — | — | — | — | — | — | 40.00 | — |
| Nanoclay Masterbatch II | — | — | — | — | — | — | — | — | 40.00 |
| Nanoclay Masterbatch III | — | — | — | — | — | 8.96 | — | — | — |

TABLE III-continued

| | | | | | | | | | |
|---|---|---|---|---|---|---|---|---|---|
| Treated Nanoclay I | — | — | — | 4.48 | — | — | — | — | — |
| Treated Nanoclay II | — | — | — | — | 4.48 | — | — | — | — |
| Treated Nanoclay III | — | — | — | — | — | — | 4.48 | — | — |
| Melt Temp., @, Dump, (° C.) | 171 | 160 | 164 | 173 | 173 | 164 | 163 | 172 | 163 |
| Hardness; ASTM, Shore D | 45 | 42 | 44 | 45 | 46 | 46 | 46 | 46 | 46 |
| Specific Gravity | 0.937 | 0.937 | 0.938 | 0.942 | 0.941 | 0.942 | 0.932 | 0.935 | 0.922 |
| Ultimate Tensile Strength (MPa) | 11.09 | 9.41 | 9.72 | 11.22 | 11.83 | 11.95 | 11.50 | 11.77 | 10.68 |
| Ultimate Elongation (%) | 296 | 148 | 220 | 261 | 263 | 289 | 257 | 323 | 222 |
| M100 (MPa) | 9.40 | 9.21 | 8.98 | 9.79 | 10.29 | 10.39 | 10.09 | 9.67 | 10.08 |
| Tension Set (%) | 40.5 | 35 | 35 | | 37.5 | 43 | 41.5 | 41.5 | 41 |
| Wt. Gain (%) | 48 | 46 | 43 | 50 | 45 | 48 | 47 | 49 | 42 |

The data in Table III again confirms the trends in the previous tables where nanoclay-filled thermoplastic vulcanizates show an overall improved balance of properties as compared to the comparative samples. It is noted that the introduction and mixing of the ingredients under an inert atmosphere further enhances the improved balance of properties.

Samples 38-44

Seven additional samples were prepared using similar ingredients as the previous samples, including the same thermoplastic vulcanizate. Introduction and mixing of the ingredients took place within an eight-barrel, two-lobe, twin-screw extruder of 43 mm diameter (L/D 42). The set temperature profile along the length of the extruder ranged from 150° C. in barrel section 1 to 170° C. in barrel section 8; through put rates ranged form about 34 to about 68 kg per hour, and the dump temperature ranged from about 155° C. to about 180° C.

The ingredients employed, their amounts, and data obtained from testing is set forth in Table IV.

For samples 38-44, the measurements were taken on 150 plaques prepared by die cutting injection molded plaques having a thickness of 2.0 mm. The onset of polypropylene degradation was determined by using thermogravametric analysis in nitrogen. Heat distortion temperature was determined by ISO 75B-1,-2. And G' was determined by an ARES Rheometer in oscillating shear mode at frequency sweep run at 200° C. at a oscillatory strain of 10%. It is also noted that the use of antioxidant gave improved properties.

The data in Table IV confirms the trends in the previous tables when large-scale mixing equipment is employed to mix the nanoclay into the thermoplastic vulcanizate. Also, the data in Table IV shows that the use of nanoclays increase temperature at which the onset of polypropylene degradation occurs. Still further, the data in Table IV shows that the use of nanoclays significantly increases the G' (elastic storage modulus) of the melt.

Various modifications and alterations that do not depart from the scope and spirit of this invention will become apparent to those skilled in the art. This invention is not to be duly limited to the illustrative embodiments set forth herein.

TABLE IV

| | Sample | | | | | | |
|---|---|---|---|---|---|---|---|
| | 38 | 39 | 40 | 41 | 42 | 43 | 44 |
| Invention/Comparative | C | I | C | I | C | I | C |
| Ingredients | % | % | % | % | % | % | % |
| Thermoplastic Vulcanizate | 100 | 59.5 | 60 | 59.5 | 59.5 | 60 | 60 |
| Unfunctionalized Polypropylene (Low-MFR) | — | 27.34 | 27.34 | 27.34 | 27.34 | 27.84 | 27.84 |
| Unfunctionalized Polypropylene (High-MFR) | — | — | 7.68 | — | 7.68 | — | 7.68 |
| Maleated Polypropylene | — | 7.68 | — | 7.68 | — | 7.68 | — |
| Treated Nanoclay I | — | 4.48 | — | 4.48 | — | 4.48 | — |
| Conventional clay | — | — | 2.36 | — | 2.36 | — | 2.36 |
| Parrafinic Oil | — | — | 2.12 | — | 2.12 | — | 2.12 |
| Antioxidant | — | — | 1 | 1 | 1 | — | — |
| Hardness; ASTM, Shore D | 66A | 45D | 42D | 45D | 42D | 42D | 41D |
| Hardness; ISO, Sh.A/D | 69A | 40D | 38D | — | — | — | — |
| Specific Gravity | 0.929 | 0.932 | 0.935 | 0.939 | 0.939 | 0.936 | 0.929 |
| Ultimate Tensile Strength (MPa) | 6.99 | 17.73 | 15.43 | 18.18 | 15.81 | 16.60 | 15.58 |
| Ultimate Elongation (%) | 473 | 651 | 605 | 646 | 603 | 601 | 589 |
| M100 (MPa) | 2.47 | 9.71 | 8.74 | 9.75 | 8.49 | 9.36 | 8.50 |
| Wt. Gain (%); 24 h@121° C. | 99 | 49 | 48 | 49 | 49 | 51 | 50 |
| Tension Set (%) | 10 | 38 | 40 | 49 | 48 | 48 | 48 |
| G' at 0.01 rad/sec (Pa) @ 200° C. | — | — | — | — | — | 6022 | 1571 |
| G' at 0.1 rad/sec (Pa) @ 200° C. | — | — | — | — | — | 9185 | 2570 |
| Onset of Polypropylene Degradation (° C.) | — | — | — | — | — | 407 | 396 |
| Heat Distortion Temperature | | | | | | | |
| @ 455 KPa (° C.) | — | — | — | 55 | 53 | 54 | 52 |
| @ 1834 KPa (° C.) | — | — | — | 39 | 35 | 38 | 35 |

What is claimed is:

1. A method for preparing a nanoclay-filled thermoplastic vulcanizate, the method comprising:
    preparing a thermoplastic vulcanizate comprising an olefinic elastomeric copolymer by dynamic vulcanization, where the olefinic elastomeric copolymer is cured using a phenolic cure system and to an extent that not more than 6 wt % of the olefinic elastomeric copolymer is extractable from the thermoplastic vulcanizate by cyclohexane at 23° C.;
    introducing a functionalized thermoplastic resin, a polypropylene resin possessing a melt flow rate that is less than or equal to 10 dg/min (low-MFR polypropylene), and a surface-modified nanoclay to the thermoplastic vulcanizate after dynamic vulcanization; and
    blending the thermoplastic vulcanizate, functionalized thermoplastic resin, the low-MFR polypropylene and surface-modified nanoclay,
    where said blending takes place at a temperature above the melt temperature of the thermoplastic vulcanizate but below the temperature at which the surface-modified nanoclay degrades, and
    wherein the nanoclay-filled thermoplastic vulcanizate comprises of from 6 wt % to 40 wt % of the functionalized thermoplastic resin and the vulcanizate comprises from 2 to 10 wt % of the surface-modified nanoclay; and
    wherein the nanoclay-filled thermoplastic vulcanizate has a Shore D Hardness, as determined according to ASTM D-2240 with a 5 second time interval, of less than 60.

2. The method of claim 1, where the thermoplastic vulcanizate, prior to said step of introducing, includes an inorganic filler selected from the group consisting of calcium carbonate, clay, silica, talc, titanium dioxide, and carbon black.

3. The method of claim 2, where the functionalized thermoplastic resin is maleated polypropylene.

4. A method for preparing a nanoclay-filled thermoplastic vulcanizate, the method comprising:
    preparing a thermoplastic vulcanizate by dynamically vulcanizing an olefinic elastomeric copolymer within a mix with a thermoplastic resin and a phenolic cure system;
    introducing to the thermoplastic vulcanizate, a polypropylene resin possessing a melt flow rate that is less than or equal to 10 dg/min (low-MFR polypropylene), and a functionalized thermoplastic resin after dynamic vulcanization a surface-modified nanoclay; and
    mixing the thermoplastic vulcanizate, the nanoclay, the low-MFR polypropylene and the thermoplastic resin at a temperature above the melt temperature of the thermoplastic resin,
    wherein the nanoclay-filled thermoplastic vulcanizate comprises of from 6 wt % to 40 wt % of the functionalized thermoplastic resin and the vulcanizate comprises from 2 to 10 wt % of the surface-modified nanoclay; and
    wherein the nanoclay-filled thermoplastic vulcanizate has a Shore D Hardness, as determined according to ASTM D-2240 with a 5 second time interval, of less than 60.

5. The method of claim 4, where said step of introducing includes adding the nanoclay and the functionalized thermoplastic resin to the thermoplastic vulcanizate while the thermoplastic vulcanizate is in its molten state.

6. The method of claim 4, where said mixing takes place at a temperature of from about 130° C. to about 180° C.

7. The method of claim 4, where said mixing takes place under an inert atmosphere.

8. The method of claim 4, where mixing takes placed with in a Brabender mixer.

9. The method of claim 4, where said mixing takes place within a reactive extruder.

10. The method of claim 4, where said surface-modified nanoclay includes phyllosilicates.

11. The method of claim 4, where the nanoclay includes a synthetic nanoclay.

12. The method of claim 4, where the surface-modified nanoclay includes a layered clay that has been treated with a cationic surfactant.

13. The method of claim 4, where the surface-modified nanoclay includes a layered clay that has been treated with an ammonium, phosphonium, or sulfonium derivative of an aliphatic, aromatic, or arylaliphatic amine, phosphine, or sulfide.

14. The method of claim 4, where the surface-modified nanoclay is prepared by onium ion modification.

15. The method of claim 4, where the thermoplastic resin includes a crystalline, semi-crystalline, or a crystallizable polyolefin.

16. The method of claim 4, where the mix includes an inorganic filler selected from the group consisting of calcium carbonate, clay, silica, talc, titanium dioxide, and carbon black.

17. The method of claim 4, where said step of dynamically vulcanizing effects a degree of cure where not more than 5 wt % of the olefinic elastomeric copolymer is extractable from the thermoplastic vulcanizate by cyclohexane at 23° C.

18. The method of claim 5, where said nanoclay and said functionalized thermoplastic resin are combined into a masterbatch prior to said step of combining the thermoplastic vulcanizate with a nanoclay and a thermoplastic resin.

19. The method of claim 18, where the functionalized thermoplastic resin is maleated polypropylene.

20. The method of claim 10, where the surface-modified phyllosilicates include surface-modified montmorillonite, smectite, illite, sepiolite, palygorskite, muscovite, allevardite, amesite, fluorohectorite, bentonite, or mixtures thereof.

21. The method of claim 13, where the surface-modified nanoclay includes a nanoclay modified with a quaternary ammonium salt.

22. A method for preparing a nanoclay-filled thermoplastic vulcanizate, comprising:
    blending a phenolic cure system with (i) a thermoplastic vulcanizate comprising a dynamically vulcanized olefinic elastomeric copolymer dispersed within a thermoplastic matrix; (ii) at least one functionalized thermoplastic resin; (iii) a low-MFR polypropylene resin possessing a melt flow rate that is less than or equal to 10 dg/min (low-MFR polypropylene); and (iv) a surface-modified nanoclay at a temperature above the melt temperature of the thermoplastic vulcanizate, but below the temperature at which the surface-modified nanoclay degrades,
    wherein the surface-modified nanoclay, the low-MFR polypropylene resin, and the functionalized thermoplastic resin are added to the thermoplastic vulcanizate after dynamic vulcanization while the thermoplastic vulcanizate is in a molten state, and
    wherein the nanoclay-filled thermoplastic vulcanizate comprises of from 6 wt % to 40 wt % of the functionalized thermoplastic resin and the vulcanizate comprises from 2 to 10 wt % of the surface-modified nanoclay; and
    wherein the nanoclay-filled thermoplastic vulcanizate has a Shore D Hardness, as determined according to ASTM D-2240 with a 5 second time interval, of less than 50.

23. The method of claim 22, further comprising blending at least one non-functionalized thermoplastic resin into the blend of the thermoplastic vulcanizate, at least one functionalized thermoplastic resin, and surface-modified nanoclay.

24. The method of claim 22, wherein the thermoplastic vulcanizate comprises an ethylene-alpha-olefin-vinyl norbornene elastomeric polymer; and at least one polyolefin selected from the group consisting of: thermoplastic homopolymers or copolymers of ethylene and propylene; polybutylene; polyethylene terephthalate; polybutylene terephthalate; polyamides; and mixtures thereof.

25. The method of claim 22, where the thermoplastic vulcanizate, prior to said step of blending, includes an inorganic filler selected from the group consisting of calcium carbonate, clay, silica, talc, titanium dioxide, and carbon black.

26. The method of claim 22, where dynamically vulcanized olefinic elastomeric copolymer is cured to an extent where not more than 5 wt % of the olefinic elastomeric copolymer is extractable from the thermoplastic vulcanizate by cyclohexane at 23° C.

27. The method of claim 24, where the functionalized thermoplastic resin is maleated polypropylene.

* * * * *